United States Patent
Lee et al.

(10) Patent No.: US 9,002,708 B2
(45) Date of Patent: Apr. 7, 2015

(54) SPEECH RECOGNITION SYSTEM AND METHOD BASED ON WORD-LEVEL CANDIDATE GENERATION

(75) Inventors: Sang Ho Lee, Seongnam-si (KR); Hoon Kim, Seongnam-si (KR); Dong Ook Koo, Seongnam-si (KR); Dae Sung Jung, Seongnam-si (KR)

(73) Assignee: NHN Corporation, Gyeonggi-do (KR)

( * ) Notice: Subject to any disclaimer, the term of this patent is extended or adjusted under 35 U.S.C. 154(b) by 76 days.

(21) Appl. No.: 13/466,700

(22) Filed: May 8, 2012

(65) Prior Publication Data

US 2012/0290303 A1  Nov. 15, 2012

(30) Foreign Application Priority Data

May 12, 2011 (KR) .................. 10-2011-0044613

(51) Int. Cl.
*G10L 15/00* (2013.01)
*G10L 15/04* (2013.01)
*G10L 15/22* (2006.01)
*G10L 15/30* (2013.01)

(52) U.S. Cl.
CPC ........ *G10L 15/22* (2013.01); *G10L 15/30* (2013.01)

(58) Field of Classification Search
None
See application file for complete search history.

(56) References Cited

U.S. PATENT DOCUMENTS

| | | | |
|---|---|---|---|
| 2006/0149551 A1 | 7/2006 | Ganong, III et al. | |
| 2006/0293889 A1* | 12/2006 | Kiss et al. | 704/235 |
| 2007/0033037 A1* | 2/2007 | Mowatt et al. | 704/251 |
| 2007/0100635 A1* | 5/2007 | Mahajan et al. | 704/276 |
| 2007/0208567 A1* | 9/2007 | Amento et al. | 704/270 |
| 2008/0059186 A1* | 3/2008 | Mowatt et al. | 704/257 |
| 2008/0077406 A1* | 3/2008 | Ganong | 704/251 |
| 2009/0228274 A1 | 9/2009 | Terrell, II et al. | |
| 2009/0326938 A1* | 12/2009 | Marila et al. | 704/235 |
| 2010/0315266 A1* | 12/2010 | Gunawardana et al. | 341/22 |
| 2011/0010174 A1* | 1/2011 | Long et al. | 704/235 |

(Continued)

FOREIGN PATENT DOCUMENTS

| | | |
|---|---|---|
| EP | 0 840 286 | 5/1998 |
| JP | 7-222248 | 8/1995 |
| JP | 2000-330586 A | 11/2000 |

(Continued)

OTHER PUBLICATIONS

European Search Report for corresponding EP Application No. 12167745.4 dated Jul. 19, 2012.

(Continued)

*Primary Examiner* — Richemond Dorvil
*Assistant Examiner* — Thuykhanh Le
(74) *Attorney, Agent, or Firm* — Harness, Dickey & Pierce, P.L.C.

(57) ABSTRACT

A speech recognition system and method based on word-level candidate generation are provided. The speech recognition system may include a speech recognition result verifying unit to verify a word sequence and a candidate word for at least one word included in the word sequence when the word sequence and the candidate word are provided as a result of speech recognition. A word sequence displaying unit may display the word sequence in which the at least one word is visually distinguishable from other words of the word sequence. The word sequence displaying unit may display the word sequence by replacing the at least one word with the candidate word when the at least one word is selected by a user.

15 Claims, 13 Drawing Sheets

(56) References Cited

U.S. PATENT DOCUMENTS

| | | | |
|---|---|---|---|
| 2011/0201387 A1* | 8/2011 | Paek et al. | 455/566 |
| 2013/0046544 A1* | 2/2013 | Kay et al. | 704/275 |

FOREIGN PATENT DOCUMENTS

| | | |
|---|---|---|
| JP | 2009-098490 | 5/2009 |
| JP | 2010-217628 A | 9/2010 |
| JP | 2010-231433 A | 10/2010 |
| KR | 10-1999-0088216 | 12/1999 |
| KR | 10-2004-0008546 | 1/2004 |
| WO | 2007/101089 | 9/2007 |

OTHER PUBLICATIONS

Japanese Office Action issued on Oct. 14, 2014 corresponding to JP Patent Application No. 2012-106776.

* cited by examiner

SPEECH RECOGNITION SYSTEM AND METHOD BASED ON WORD-LEVEL CANDIDATE GENERATION

CROSS REFERENCE TO RELATED APPLICATION

This application claims priority from and the benefit of Korean Patent Application No. 10-2011-0044613, filed on May 12, 2011, which is hereby incorporated by reference for all purposes as if fully set forth herein.

BACKGROUND OF THE INVENTION

1. Field of the Invention

Exemplary embodiments of the present invention relate to a speech recognition system and method based on word-level candidate generation.

2. Discussion of the Background

During dictation using speech recognition, a speaker/user may be presented with a number of options corresponding to the user's speech recognized by a speech recognition system. When a large number of candidate sentences are provided to the user as a result of the speech recognition, the user may find it difficult to select a desired sentence from the provided sentences, which are slightly different from one another. For instance, if the speech recognition system is provided in a terminal, such as a mobile terminal, smart phone, or personal digital assistant (PDA), it may be difficult to display all the candidate sentences at the same time to the user. Accordingly, since all the candidate sentences are not displayed at the same time, the user may experience inconvenience in selecting the most suitable sentence.

Hereinafter, a speech recognition system and method will be described for providing a speech recognition service having an effective speech recognition system.

The above information disclosed in this Background section is only for enhancement of understanding of the background of the invention and therefore it may contain information that does not form any part of the prior art nor what the prior art may suggest to a person of ordinary skill in the art.

SUMMARY OF THE INVENTION

Exemplary embodiments of the present invention provide a speech recognition system and method that provide a more effective method of revising a result of a speech recognition process.

Additional features of the invention will be set forth in the description which follows, and in part will be apparent from the description, or may be learned by practice of the invention.

Exemplary embodiments of the present invention disclose a speech recognition system including a speech recognition result verifying unit and a word sequence displaying unit. The speech recognition result is configured to verify a speech recognition result comprising a word sequence and at least one candidate word for at least one word in the word sequence. The word sequence displaying unit is configured to display the word sequence. The at least one word having the at least one candidate word is visually distinguishable from other words of the word sequence. In response to the at least one word being selected, the word sequence displaying unit is configured to display the word sequence by replacing the at least one word with the at least one candidate word.

Exemplary embodiments of the present invention disclose a speech recognition system including a speech recognition result generating unit and a speech recognition result providing unit. The speech recognition result generation unit is configured to determine a word sequence corresponding to a sound signal and at least one candidate word for at least one word included in the word sequence, and to generate a speech recognition result comprising the word sequence and the at least one candidate word. The speech recognition result providing unit is configured to provide the speech recognition result to a terminal. The word sequence is displayed on the terminal. The at least one word is visually distinguishable from other words of the word sequence. In response to selection of the at least one word, the word sequence is displayed by replacing the at least one word with the at least one candidate word.

Exemplary embodiments of the present invention disclose a speech recognition method including verifying, by a processor, a word sequence and at least one candidate word for at least one word in the word sequence in response to receiving a speech recognition result comprising the word sequence and the at least one candidate word. The method includes displaying by a display unit connected to the processor, the word sequence in which the at least one word is visually distinguishable from other words of the word sequence. The displaying includes displaying the word sequence by replacing the at least one word with the at least one candidate word in response to the at least one word being selected.

Exemplary embodiments of the present invention disclose a speech recognition method including determining, by a processor, a word sequence corresponding to a sound signal and at least one candidate word for at least one word in the word sequence, and generating, by the processor, the word sequence and candidate word as a speech recognition result, and providing the speech recognition result to a terminal. The word sequence is displayed on the terminal. The at least one word is visually distinguishable from other words of the word sequence. In response to selection of the at least one word, the word sequence is displayed by replacing the at least one word with the at least one candidate word.

Exemplary embodiments of the present invention disclose a speech recognition system including a speech recognition result verifying unit and a word sequence displaying unit. The speech recognition result verifying unit is configured to verify a result comprising a word sequence and at least one candidate word for at least one word in the word sequence. The word sequence displaying unit is configured to display the word sequence in which the at least one word is visually distinguishable from other words of the word sequence. The word sequence displaying unit displays a list including the at least one candidate word in response to the at least one word being selected.

Exemplary embodiments of the present invention disclose a speech recognition system including a speech recognition result generating unit and a speech recognition result providing unit. The speech recognition result generating unit is configured to determine a word sequence corresponding to a sound signal and at least one candidate word for at least one word in the word sequence, and to generate a speech recognition result comprising the word sequence and the candidate word. The speech recognition result providing unit is configured to provide the speech recognition result to a terminal. The word sequence is displayed on the terminal. The at least one word is visually distinguishable from other words of the word sequence. In response to the at least one word being selected, the terminal displays a list comprising the at least one candidate word.

Exemplary embodiments of the present invention disclose a speech recognition method including verifying, by a processor, a word sequence and at least one candidate word for at least one word in the word sequence in response to receiving a speech recognition result comprising the word sequence and the candidate word. The method includes displaying, by a display unit connected to the processor, the word sequence in which the at least one word is visually distinguishable from other words of the word sequence. The displaying comprises displaying a list comprising the at least one candidate word in response to selection of the at least one word.

Exemplary embodiments of the present invention disclose a speech recognition method including determining, by a processor, a word sequence corresponding to a sound signal and a candidate word for at least one word in the word sequence, generating, by the processor, a speech recognition result comprising the word sequence and the candidate word, and providing the speech recognition result to a terminal. The word sequence is displayed on the terminal. The at least one word is visually distinguishable from other words of the word sequence. A list comprising the at least one candidate word is displayed in response to a selection of the at least one word.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

Figure 1:
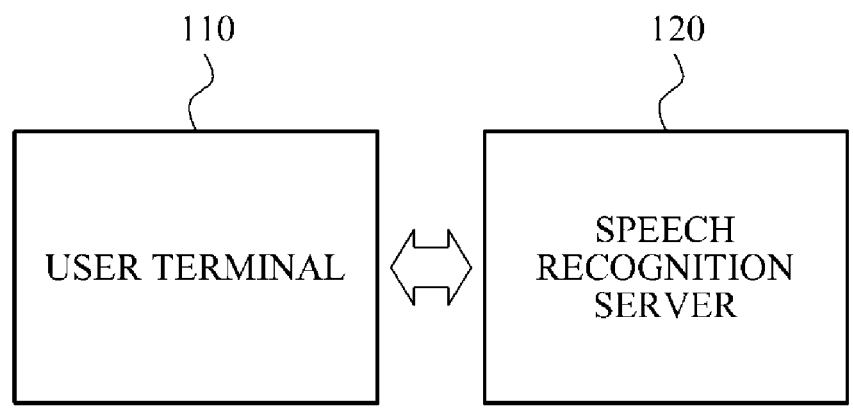
FIG. 1 is a block diagram illustrating a user terminal and a speech recognition server according to exemplary embodiments of the present invention.

The invention is described more fully hereinafter with reference to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element is referred to as being "connected to" another element, it can be directly connected to the other element, or intervening elements may be present. In contrast, when an element is referred to as being "directly connected to" another element, there are no intervening elements present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, exemplary embodiments of the present invention will be described in detail with reference to the accompanying drawings.

FIG. 1 is a block diagram illustrating a user terminal 110 and a speech recognition server 120 according to exemplary embodiments of the present invention.

The user terminal 110 may transmit, to the speech recognition server 120, a sound signal by receiving an input of the sound signal through an input device. The speech recognition server 120 may generate a result of a speech recognition process corresponding to the received sound signal, and may transmit the result of the speech recognition process to the user terminal 110.

The user terminal 110 may verify a word sequence included in the received result and a candidate word for at least one word in the word sequence, and may display, on a display screen, the word sequence in which the at least one word having the candidate word may be displayed to be distinguished from other words of the word sequence.

The user terminal 110 may be any suitable terminal including, for example, mobile phones, smart phones, personal digital assistants, electronic pads, laptops, computers, or televisions.

Figure 2:
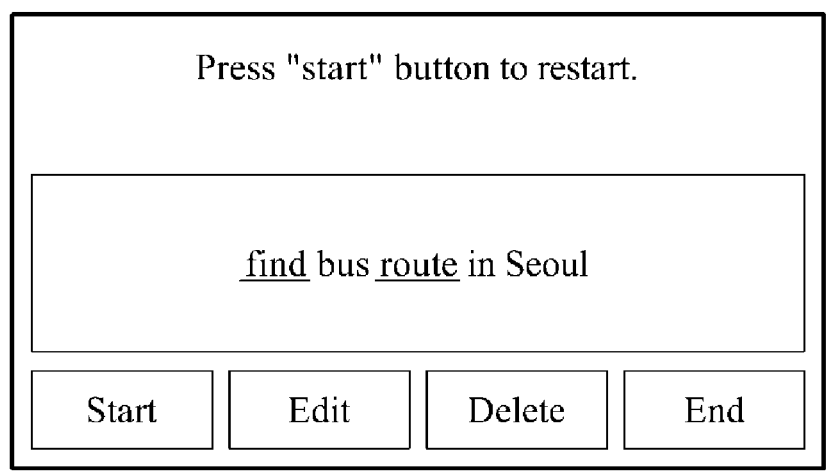
FIG. 2 is a diagram illustrating a word sequence displayed on a display screen of a user terminal according to exemplary embodiments of the present invention.

FIG. 2 is a diagram illustrating a word sequence displayed on a display screen 200 of a user terminal 110 according to exemplary embodiments of the present invention. The display screen 200 may be a portion of a display screen of the user terminal 110 of FIG. 1. In FIG. 2, the display screen 200 may display a word sequence, for example, "find bus route in Seoul." included in a result of speech recognition. A word among the word sequence may have a corresponding candidate word and may be displayed in a visually distinguishable manner from other words. For example, in FIG. 2, the words "find" and "route" may have candidate words and may be underlined to distinguish them from the other words "bus," "in," and "Seoul" that may not have candidate words.

The user terminal 110 may display the word sequence by replacing a word having one or more candidate words with one of its candidate words when the word having one or more candidate words is selected by a user. The word that is selected by the user may be visually distinguishable from other words and may be selected through a user interface provided by the user terminal 110. For example, the visually distinguishable word may be selected by the user by touching a position on the display screen 200 at which the visually distinguishable word is displayed. The user may touch the display screen 200 using a stylus or a finger of the user. It should be understood that various suitable graphical user interfaces may be used to receive a word selection from the user.

Figure 3:
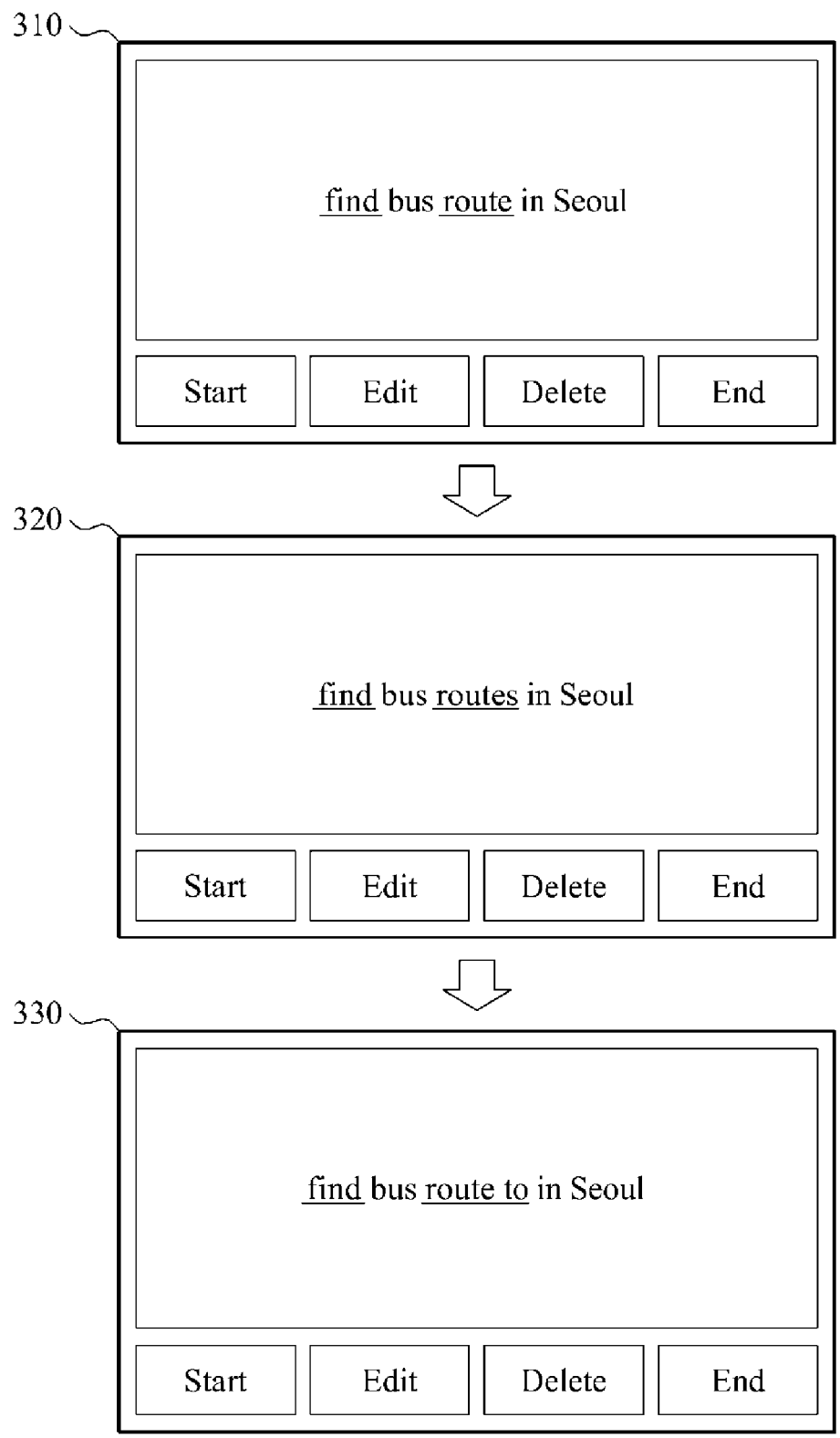
FIG. 3 is a diagram illustrating an example of replacing a word with a candidate word in a word sequence displayed on a display screen of a user terminal according to exemplary embodiments of the present invention.

FIG. 3 is a diagram illustrating an example of replacing a word in a word sequence displayed on a display screen 200 of a user terminal 110 with a candidate word according to exemplary embodiments of the present invention. Display screens 310, 320, and 330 of FIG. 3 may correspond to a portion of the display screen 200 of the user terminal 110 of FIG. 1.

In the display screen 310, a word sequence included in an initial result of speech recognition, "find bus route in Seoul", is displayed. When the user selects a word "route", the word sequence may be displayed by replacing the word "route" with a candidate word "routes", as shown in the display screen 320. The word "routes" may also be underlined to be distinguished from the other words that may not have candidate words.

In FIG. 3, although the words are underlined to be distinguished, underlining of the words is an example only, and various suitable methods may be used to distinguish words, including, for example, a method of displaying the words using different sizes, colors, or shapes.

When the user reselects the word "routes", the word sequence may be displayed with the word "routes" being replaced by another candidate word "route to", as shown in the display screen 330.

When the other candidate word (e.g., "route to") is not available for selection, the original word sequence may be displayed once again with the word "routes" being replaced by the initial word "route", as shown on the display screen 310.

As can be appreciated from the foregoing description, candidate words may be changed sequentially based on one or more selections made by the user, instead of providing a list of the candidate words for the words included in a word sequence. The candidate words may be arranged based on confidences according to speech recognition, and may be displayed in order of highest confidence to lowest confidence. In most cases, a probability that a word desired by the user may be displayed by one or two changes being made is considerably high. Accordingly, a dictation service by means of speech recognition may be provided to the user more efficiently, when compared to a service in which a list of the candidate words may be provided. Methods of calculating the confidences of words based on speech recognition are well known, and any one of these known methods may be used to determine the confidences.

In FIG. 3, a function through which the user is able to directly edit a corresponding word through an "Edit" user interface (e.g., icon) may also be provided.

The user terminal 110 may provide a "Delete" user interface (e.g., icon) for deleting the entire displayed word sequence. For example, by selecting the "Delete" icon in the screen 200 as shown in FIG. 3, the user may delete the word sequence displayed at once. Subsequently, the user may input a sentence directly, or may restart a speech recognition process when an undesirable word sequence is displayed as a result of speech recognition. Alphanumeric keys may be provided in the terminal 110 for inputting letters, words, and/or sentences. Various known methods may be used for inputting text through alphanumeric keys in a terminal.

Figure 4:
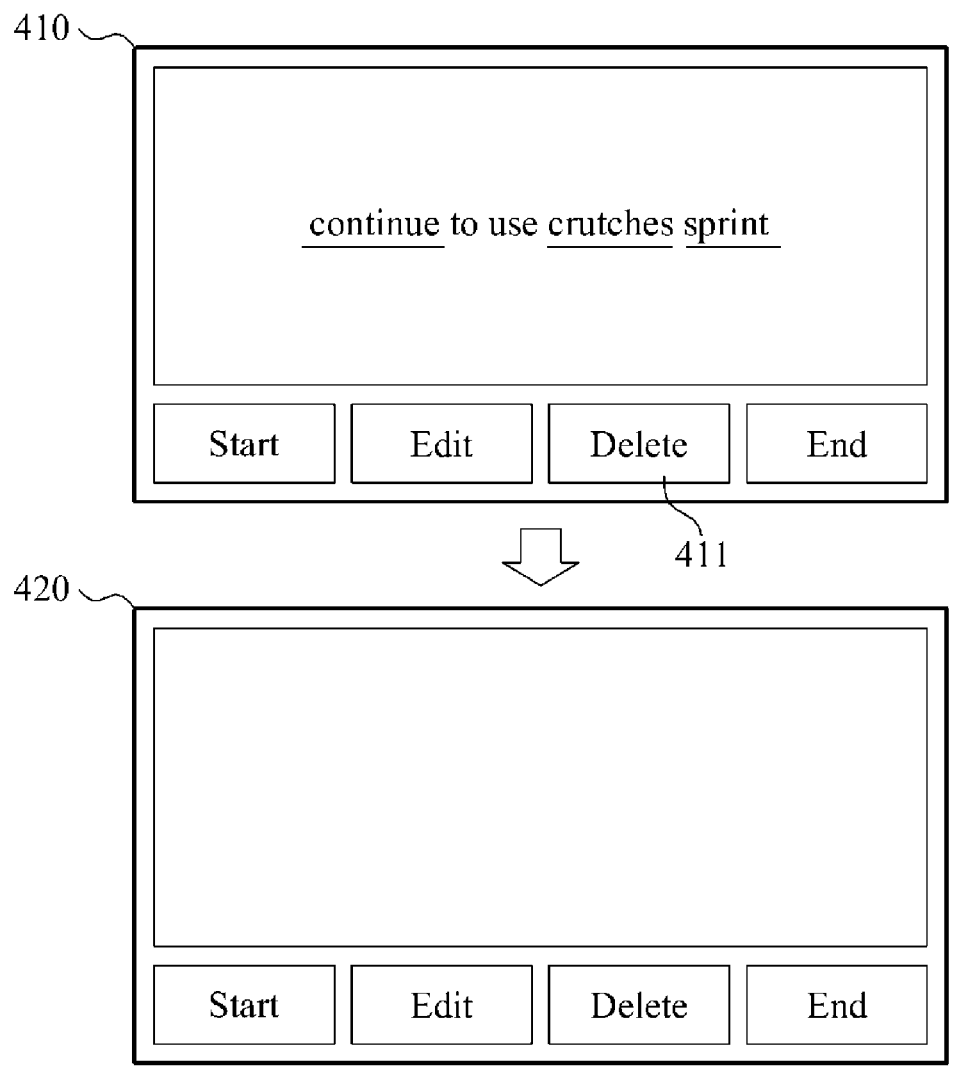
FIG. 4 is a diagram illustrating an example of deleting an entire word sequence displayed using a user interface according to exemplary embodiments of the present invention.

FIG. 4 is a diagram illustrating an example of deleting an entire word sequence that is displayed, using a user interface according to exemplary embodiments of the present invention. Display screens 410 and 420 of FIG. 4 may correspond to a portion of the display screen 200 of the user terminal 110 of FIG. 1.

A word sequence included as a result of speech recognition is displayed on the display screen 410. When a user generates an event by selecting a user interface, for example, "Delete" 411, provided by the user terminal 110, the entire word sequence may be deleted as shown on the display screen 420. For example, when a sentence or a word sequence "continue to use crutches sprint" is displayed and is different from a sentence or a word sequence desired by the user, the user may desire to input a sentence directly, or to restart a speech recognition process, rather than editing the sentence or the word sequence.

The user terminal 110 may provide, to the user, a user interface, for example, "Delete" 411, and may delete the entire sentence displayed in response to the user generating an event, for example, by touching "Delete" 411.

The user terminal 110 may also include a signature with respect to the speech recognition process along with the word sequence prepared by the speech recognition process. The signature may indicate that the corresponding word sequence is provided through the speech recognition process. For example, when the user terminal 110 transmits, to another terminal, a word sequence prepared by the speech recognition process, via a short message service (SMS) or an e-mail, the other user may be made aware that the transmitted word sequence has been provided through the speech recognition process due to a presence of the signature along with the transmitted word sequence.

Figure 5:
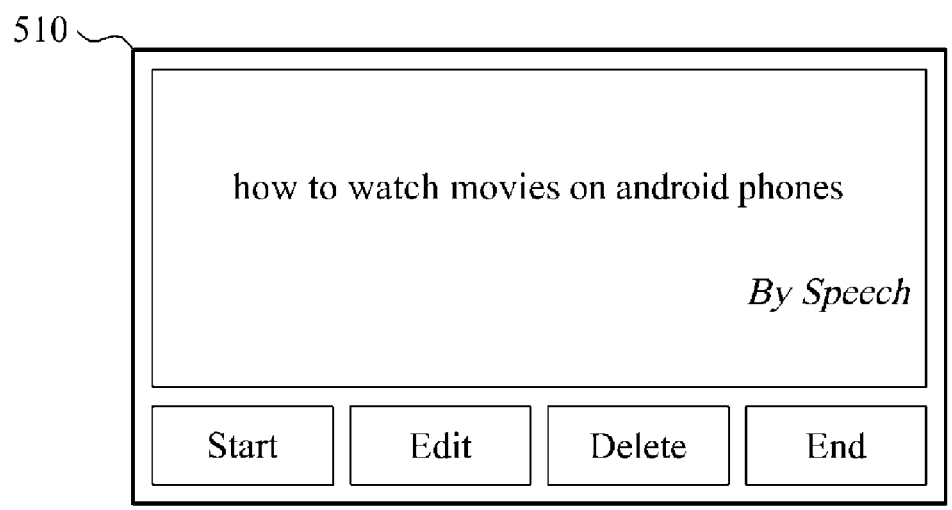
FIG. 5 is a diagram illustrating a signature provided in a user terminal according to exemplary embodiments of the present invention.

FIG. 5 is a diagram illustrating a signature provided in a user terminal 110 according to exemplary embodiments of the present invention. A display screen 510 of FIG. 5 may correspond to a portion of the display screen 200 of the user terminal 110 of FIG. 1.

The display screen 510 may display a word sequence "how to watch movies on android phones" along with a signature "By Speech". Accordingly, a user may be made aware that the corresponding word sequence corresponds to a sentence provided through a speech recognition process, by the signature "By Speech". It should be appreciated that various suitable signatures may be used. For example, the signature may be any number of words and/or images, and any combination of words and images. The signature may be set by the user or by a provider of the speech recognition service.

The speech recognition server 120 may determine a word sequence and a candidate word corresponding to a sound signal received through the user terminal 110, and may provide, to the user terminal 110, the determined word sequence and the determined candidate word as a result of the speech recognition. The speech recognition server 120 may search for all possible word sequences that may match the sound signal, and may select a word sequence having a highest probability among probabilities of the possible word sequences as the result of the speech recognition. The speech recognition server 120 may also select at least one word among other words recognized in response to receiving the sound signal as a candidate word to be included in the result of the speech recognition. In some cases, the word sequence and candidate word may be determined between a time when recognition of the at least one word is initiated and a time when the recognition is terminated. The at least one word among the other words may be selected based on confidences that may be calculated for each of the words. In some cases, the time period for determining the candidate word may be determined based on the time when the at least one word recognition is initiated, the time when the at least one word recognition is terminated, and/or a predetermined allowable time value that may be added to the time when the recognition is terminated. Depending on cases, the predetermined allowable time value may be subtracted from the time when the recognition is initiated.

Figure 6:
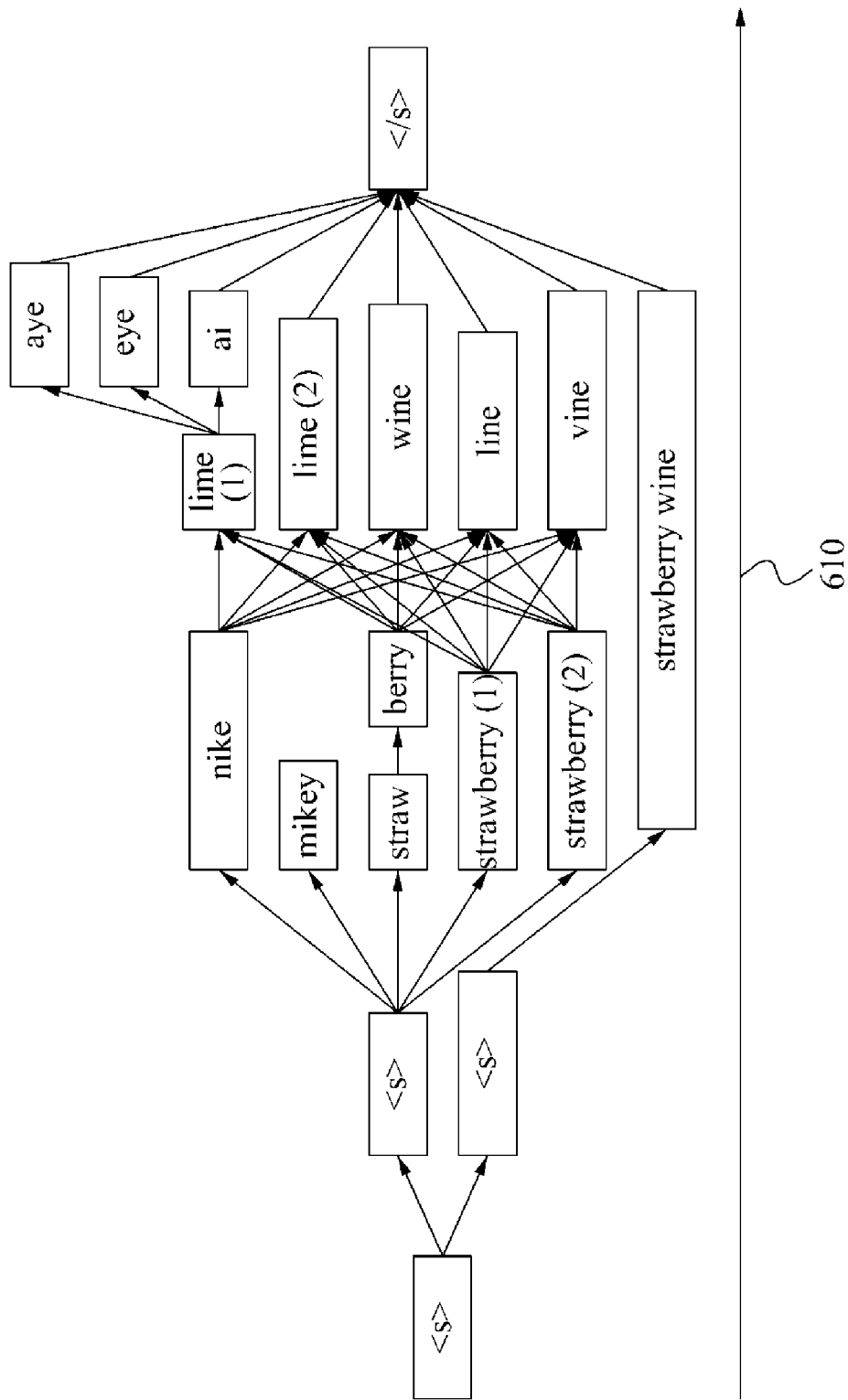
FIG. 6 is a diagram illustrating words found in response to a sound signal according to exemplary embodiments of the present invention.

FIG. 6 is a diagram illustrating matching words found in response to receiving a sound signal according to exemplary embodiments of the present invention. In FIG. 6, an arrow 610 may indicate a progression of time, and a length of a square box may indicate a time period during which a corresponding word is recognized. Identical words that are recognized during different time periods, for example, "strawberry" (1) and "strawberry" (2), and "lime" (1) and "lime" (2) may, in some cases, have identical starting times. However, the respective end times may differ. A speech recognition apparatus may find identical words having highest probabilities in a corresponding time period.

If a user says "strawberry wine" and the user terminal 110 receives an input of a sound signal corresponding to "strawberry wine", the user terminal 110 may transmit the corresponding sound signal to the speech recognition server 120. The speech recognition server 120 may analyze the received sound signal, and may select a word sequence having a highest probability, by verifying all possible word sequences. In FIG. 6, a word sequence "strawberry lime" corresponding to a combination of the word "strawberry" (1) and the word "lime" (2) may be selected as the word sequence having the highest probability.

The speech recognition server 120 may determine candidate words for the word "strawberry" (1) and the word "lime" (2) included in the word sequence having a highest probability. The speech recognition server 120 may calculate confidences for each of the words, with respect to each of the word "strawberry" (1) and the word "lime" (2), and may extract a plurality of words as candidate words in order of confidences. In some cases, the time period corresponding to determining the candidate words may be determined based on the time when the candidate word recognition is initiated, the time when the candidate word recognition is terminated, and/or a predetermined allowable time value that may be added to the time when the recognition is terminated. Depending on cases, the predetermined allowable time value may be subtracted from the time when the recognition is initiated.

For example, in order to obtain the candidate words for the word "lime" (2), the speech recognition server 120 may verify other candidate words determined during a time period corresponding to determining the word "lime" (2). The other candidate words may include words that may have identical starting times, and may be determined within a time period between a time when recognition of the word "lime" (2) is initiated and a time obtained by adding a predetermined allowable time value to a time when recognition of the word "lime" (2) is terminated. For instance, the allowable time value may be predetermined by the speech recognition server 120 to be 30 milliseconds (ms).

If another word is recognized within the corresponding time period, and if the other word has an identical starting time and an end time shorter than the time obtained by adding the predetermined allowable time value to the time when recognition of the word "lime" (2) is terminated, the speech recognition server 120 may combine the recognized words, and may determine a resulting word to be a single candidate word/phrase.

For example, the word "lime" (1) and a word "ai" may be combined, and a resulting single phrase "lime ai" may be selected as a candidate word for the word "lime" (2). The word "lime" (1) and a word "eye" may be combined, and a resulting single phrase "lime eye" may be selected as another candidate word for the word "lime" (2). Also, a word "wine," a word "line," and a word "vine" may be selected as candidate words for the word "lime" (2). In FIG. 6, only a word "lime aye" corresponding to a combination of the word "lime" (1) and a word "aye" may fail to be selected as a candidate word since the word "lime aye" may be outside of the time period. When the time period is reduced by reducing the allowable time value, a range for selecting the candidate words may decrease.

For example, when the candidate words, for example, "wine", "lime eye", "vine", "line", and "lime ai" are selected in order of confidences, the selected candidate words may be included in a result of the speech recognition process according to the order of confidences.

The user terminal 110 may display a word sequence "strawberry lime" on the display screen 200. A word having a candidate word and a word that may not have a candidate word may be displayed to be distinguished from each other. When the word "lime" is selected by the user, the word sequence may be displayed by replacing the word "lime" with the first determined word "wine". Also, when the word "wine" is reselected by the user, the word sequence may be displayed by replacing the word "wine" with the second determined word "lime eye". When further candidate words are absent, the initial word "lime" may be displayed for the user, or a function for the user to directly edit the corresponding word may be provided.

Thus, the user may verify a subsequent candidate word by selecting a candidate word, rather than searching for a desired word in a list of all the candidate words. As described in the foregoing, by determining the candidate words based on confidences, a word desired by the user may be displayed by making one or two selections. Accordingly, the user may readily and rapidly edit a predetermined word to a desired word in a word sequence, without searching though a list of all the candidate words.

Figure 7:
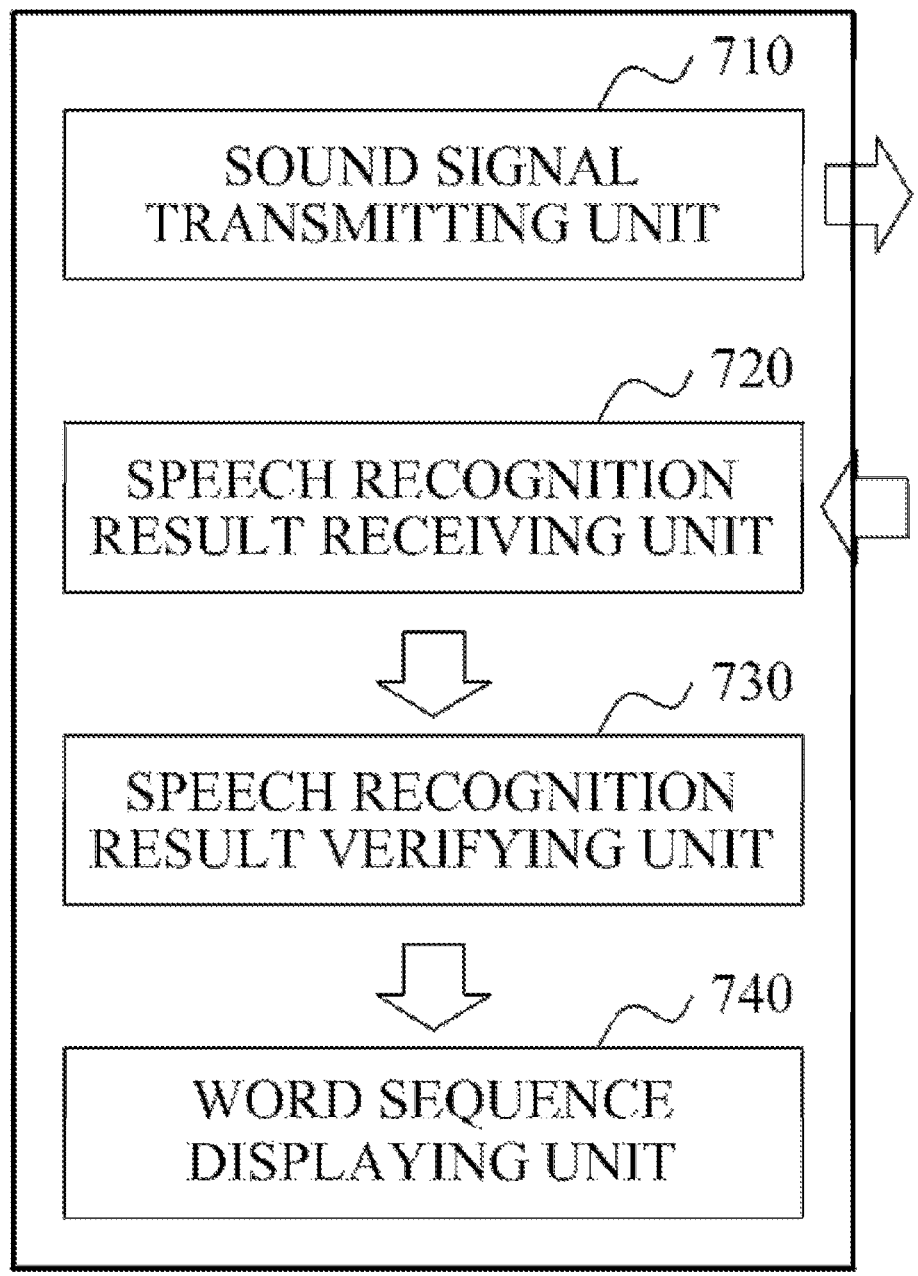
FIG. 7 is a block diagram illustrating a configuration of a speech recognition system according to exemplary embodiments of the present invention.

FIG. 7 is a block diagram illustrating a configuration of a speech recognition system 700 according to exemplary embodiments of the present invention. As shown in FIG. 7, the system 700 may include a speech recognition result verifying unit 730 and a word sequence displaying unit 740. In some cases, the system 700 may also include a sound signal transmitting unit 710 and a speech recognition result receiving unit 720. When the system 700 includes the sound signal transmitting unit 710 and the speech recognition result receiving unit 720, the system 700 may correspond to the user terminal 110 of FIG. 1.

The sound signal transmitting unit 710 may transmit, to a speech recognition server, a sound signal that may be input through an input device. For example, a sound signal generated when a user speaks may be input into the system 700 through the input device, for example, a microphone, and the sound signal transmitting unit 710 may transmit the input sound signal to the speech recognition server. The speech recognition server may correspond to the speech recognition server 120 of FIG. 1.

The speech recognition result receiving unit 720 may receive, through the speech recognition server 120, a result of speech recognition corresponding to the sound signal. A word sequence having a highest probability among probabilities of all possible word sequences matching the sound signal may be selected by the speech recognition server 120. Also, a candidate word may be selected as at least one word among other words recognized in response to the sound signal between a time when recognition of the at least one word is initiated and a time when the recognition is terminated. The at least one word among the other words may be selected based on confidences that may be calculated for each of the words. In some cases, the time period for determining the word sequence and candidate word may be determined based on the time when the at least one word recognition is initiated, the time when the at least one word recognition is terminated, and/or a predetermined allowable time value that may be added to the time when the recognition is terminated.

The speech recognition result verifying unit 730 may verify a word sequence and a candidate word when the word sequence and the candidate word for at least one word included in the word sequence are provided as a result of the speech recognition process. When a result of speech recognition is provided to the system 700 from the speech recognition server 120, the system 700 may verify the word sequence and the candidate word through the speech recognition result verifying unit 730.

The word sequence displaying unit 740 may display, on a display screen 200, the word sequence in which the at least one word having the candidate word may be displayed to be visually distinguishable from other words of the word sequence. When a displayed word having a candidate word is selected by the user, the word sequence displaying unit 740 may display the word sequence by replacing the displayed word having a candidate word with the candidate word. When another candidate word is present and the replaced candidate word is reselected by the user, the replaced candidate word may be replaced with the other candidate word.

The system 700 may further include a user interface for deleting an entire displayed word sequence. The system 700 may delete the entire word sequence in response to a user input through the user interface.

When the word sequence is displayed on the display screen, or when the word sequence is transmitted to another device, a signature indicating that the word sequence is provided through the speech recognition process may be displayed or transmitted along with the word sequence.

Figure 8:
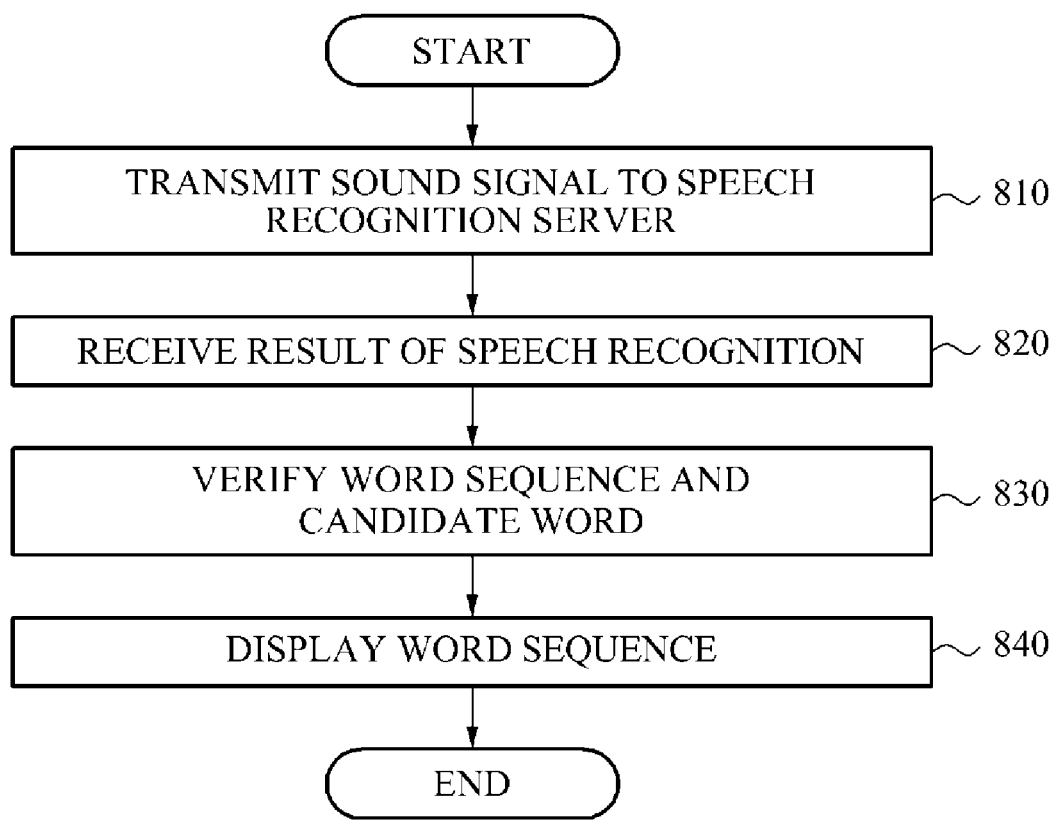
FIG. 8 is a flowchart illustrating a speech recognition method according to exemplary embodiments of the present invention.

FIG. 8 is a flowchart illustrating a speech recognition method according to exemplary embodiments of the present invention. The speech recognition method of FIG. 8 may be performed by the speech recognition system 700 of FIG. 7.

The system 700 may transmit, to a speech recognition server, a sound signal that may be input through an input device (810). For example, a sound signal generated when a user speaks may be input into the system 700 through an input device, for example, a microphone, and the system 700 may transmit the input sound signal to the speech recognition server. The speech recognition server may correspond to the speech recognition server 120 of FIG. 1.

The system 700 may receive, from the speech recognition server 120, a result of the speech recognition process corresponding to the sound signal (820). The result may include a word sequence having a highest probability among probabilities of all possible word sequences matching the sound signal, and the highest probability word sequence may be determined by the speech recognition server 120. Also, a candidate word may be provided with the word sequence. The candidate word may be selected as at least one word among other words recognized in response to the sound signal between a time when recognition of the at least one word is initiated and a time when the recognition is terminated. The at least one word among the other words may be selected based on confidences that may be calculated for each of the words. In some cases, the time period for determining the word sequence and candidate word may be determined based on the time when the at least one word recognition is initiated, the time when the at least one word recognition is terminated, and/or a predetermined allowable time value that may be added to the time when the recognition is terminated.

The system 700 may verify a word sequence and a candidate word when the word sequence and a candidate word are provided (830). For example, when a result of speech recognition is provided to the system 700 from the speech recognition server 120, the system 700 may verify the word sequence and the candidate word in the provided result.

The system 700 may display, on a word sequence displaying unit 740, the word sequence in which the at least one word having the candidate word may be displayed in a distinguishable manner from other remaining words of the word sequence (840). When the distinguishable word is selected by the user, the system 700 may display the word sequence by replacing the distinguishable word with the candidate word. When another candidate word is present and the replacing candidate word is reselected by the user, the replacing candidate word may be replaced with the other candidate word.

The system 700 may further include a user interface to provide a user interface for deleting the displayed word sequence. For example, the system 700 may delete the entire word sequence displayed when the user inputs a command through the user interface. An example of a user input through the user interface includes, but is not limited to, a user clicking on a 'Delete' icon displayed in the word sequence displaying unit 740 (e.g., screen 200).

When the word sequence is displayed on the word sequence displaying unit 740 or when the word sequence is transmitted to another device, a signature indicating that the word sequence is provided through the speech recognition process may be displayed or transmitted along with the word sequence.

Figure 9:
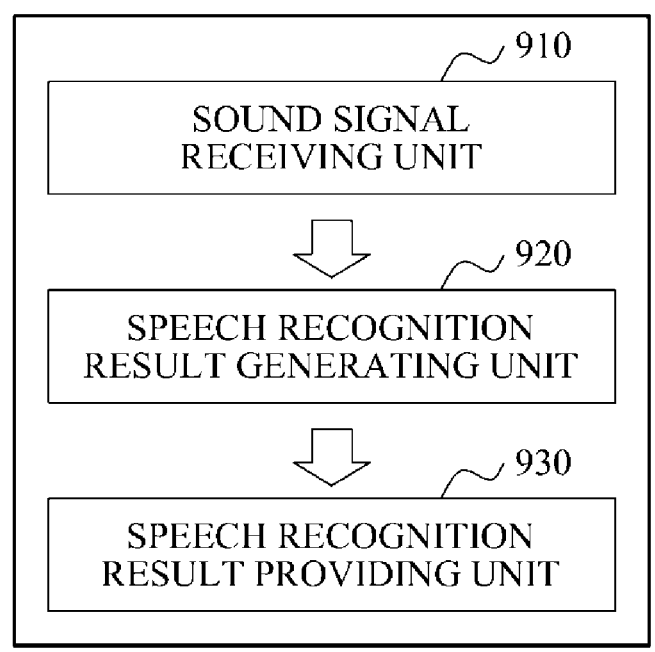
FIG. 9 is a block diagram illustrating a configuration of a speech recognition system according to exemplary embodiments of the present invention.

FIG. 9 is a block diagram illustrating a configuration of a speech recognition system 900 according to exemplary embodiments of the present invention. As shown in FIG. 9, the system 900 may include a speech recognition result generating unit 920 and a speech recognition result providing unit 930. In some cases, the system 900 may include a sound signal receiving unit 910. When the system 900 includes the sound signal receiving unit 910, the system 900 may correspond to the speech recognition server 120 of FIG. 1.

The sound signal receiving unit 910 may receive, from a user terminal 110, a sound signal that may be input through an input device of the user terminal 110. In response to the sound signal corresponding to what the user says being input through the input device of the user terminal 110, the user terminal 110 may transmit the input sound signal to the system 900, and the sound signal receiving unit 910 of the system 900 may receive the transmitted sound signal.

The speech recognition result generating unit 920 may determine a word sequence corresponding to the sound signal and a candidate word for at least one word included in the word sequence, and may generate the determined word sequence and the determined candidate word as a result of the speech recognition process. The speech recognition result generating unit 920 may select, as a word sequence to be included in the result of the speech recognition, a word sequence having a highest probability among probabilities of all possible word sequences matching the sound signal. Also, the speech recognition result generating unit 920 may select, as a candidate word to be included in the result of the speech recognition process, at least one word among other words recognized in response to the sound signal. The candidate word may be determined between a time when recognition of the at least one word is initiated and a time when the recognition is terminated. The at least one word among the other words may be selected based on confidences that may be calculated for each of the words. In some cases, the time period for determining the word sequence and candidate word may be determined based on the time when the at least one word recognition is initiated, the time when the at least one word recognition is terminated, and/or a predetermined allowable time value that may be added to the time when the recognition is terminated.

The speech recognition result providing unit 930 may provide the result of the speech recognition process to the user terminal 110. The word sequence included in the provided result may be displayed on a display screen 200 of the user terminal 110. The at least one word having the candidate word may be visually distinguishable from other remaining words of the word sequence. Also, when the at least one word displayed to be distinguished is selected by the user in the terminal, the word sequence may be displayed with the at least one word displayed being replaced by the candidate word.

A user interface used for deleting the displayed word sequence may be provided in the user terminal 110. For example, when the user inputs a command through the user interface, the entire word sequence displayed may be deleted. An example of a user input through the user interface includes, but is not limited to, a user clicking on a 'Delete' icon displayed in the screen 200 of the user terminal 110.

In addition, when the word sequence is displayed on the display screen 200, or when the word sequence is transmitted from the user terminal 110 to another device, a signature indicating that the word sequence is prepared through the speech recognition process may be displayed or transmitted along with the word sequence.

Figure 10:
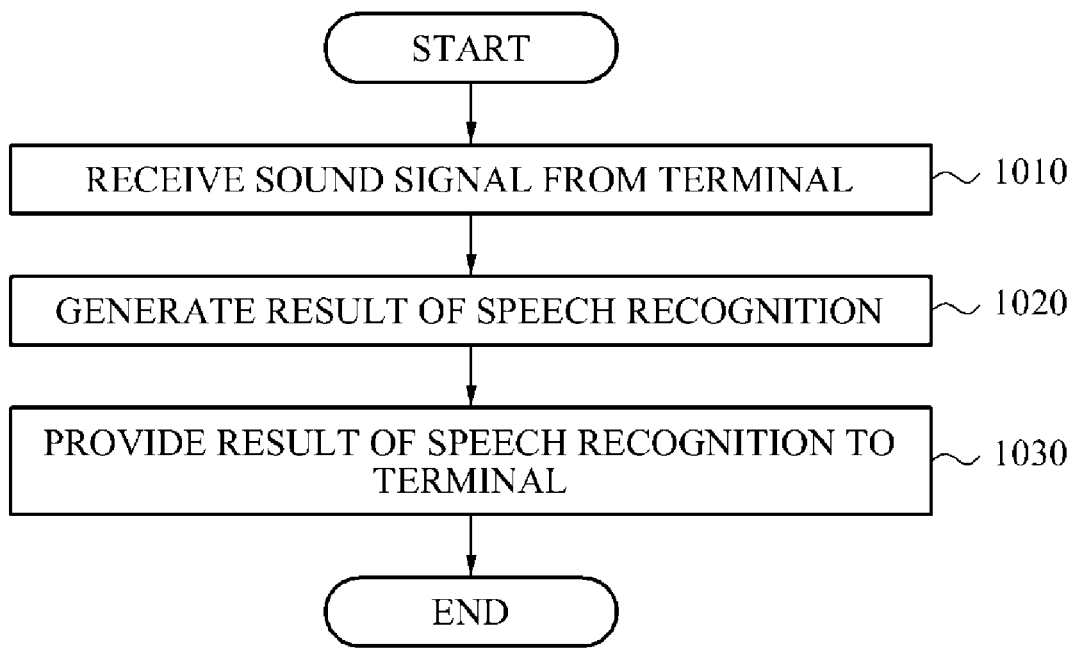
FIG. 10 is a flowchart illustrating a speech recognition method according to exemplary embodiments of the present invention.

FIG. 10 is a flowchart illustrating a speech recognition method according to exemplary embodiments of the present invention. The speech recognition method of FIG. 10 may be performed by the speech recognition system 900 of FIG. 9.

The system 900 may receive, through a terminal 110, a sound signal that may be input through an input device of the terminal 110 (1010). For example, when the sound signal corresponding to what the user says is input through the input device of the user terminal 110, the user terminal 110 may transmit the input sound signal to the system 900, and the system 900 may receive the transmitted sound signal.

The system 900 may determine a word sequence corresponding to the sound signal and a candidate word for at least one word included in the word sequence, and may generate the determined word sequence and the determined candidate word as a result of speech recognition (1020). The system 900 may select, as a word sequence to be included in the result of the speech recognition, a word sequence having a highest probability among probabilities of all possible word sequences matching the sound signal. The candidate word may be determined by system 900 between a time when recognition of the at least one word is initiated and a time when the recognition is terminated. The at least one word among the other words may be selected based on confidences that may be calculated for each of the words. In some cases, the time period for determining the word sequence and candidate word may be determined based on the time when the at least one word recognition is initiated, the time when the at least one word recognition is terminated, and/or a predetermined allowable time value that may be added to the time when the recognition is terminated.

The system 900 may provide the result of the speech recognition process to the user terminal 110 (1030). The word sequence included in the provided result may be displayed on a display screen 200 of the user terminal 110. The at least one word having the candidate word may be visually distinguishable from other words of the word sequence. When one of the at least one distinguishable words is selected by the user in the terminal, the word sequence may be displayed with the selected word replaced by the candidate word.

A user interface used for deleting the entire word sequence displayed may be provided in the user terminal 110. For example, when the user inputs a command through the user interface, the entire word sequence displayed may be deleted. An example of a user input through the user interface includes, but is not limited to, a user clicking on a 'Delete' icon displayed in the screen 200 of the user terminal 110.

In addition, when the word sequence is displayed on the display screen 200 or when the word sequence is transmitted from the user terminal 110 to another device, a signature indicating that the word sequence is prepared through the speech recognition process may be displayed or transmitted along with the word sequence.

Figure 11:
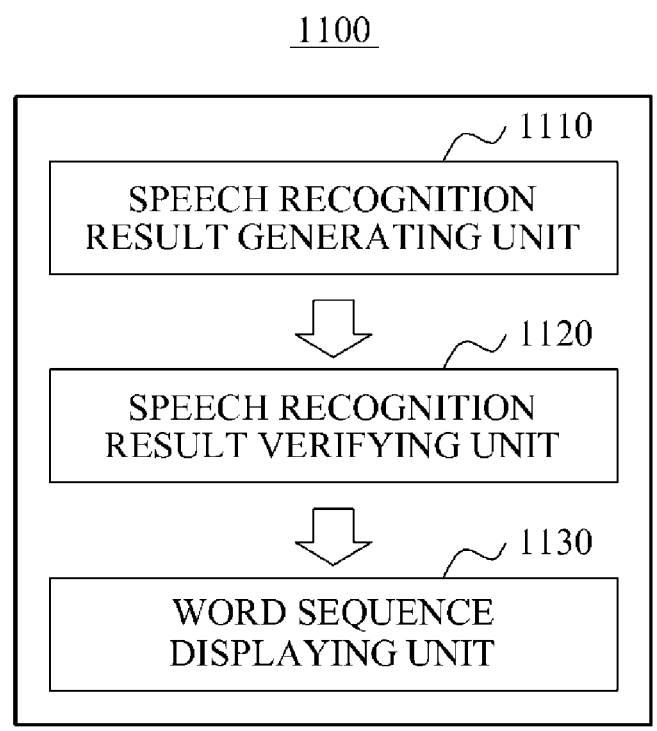
FIG. 11 is a block diagram illustrating a configuration of a speech recognition system according to exemplary embodiments of the present invention.

FIG. 11 is a block diagram illustrating a configuration of a speech recognition system 1100 according to exemplary embodiments of the present invention. In FIG. 1, the user terminal 110 and the speech recognition server 120 are needed to generate and display a result of speech recognition. In FIG. 11, the system 1100 may generate and display a result of speech recognition, in a single system. As shown in FIG. 11, the system 1100 may include a speech recognition result verifying unit 1120 and a word sequence displaying unit 1130. In some cases, the system 1100 may selectively include a speech recognition result generating unit 1110.

In cases when the system 1100 does not include the speech recognition result generating unit 1110, the system 1100 may be identical to the speech recognition system 700 of FIG. 7 which may not include the sound signal transmitting unit 710 and the speech recognition result receiving unit 720. Operations of the speech recognition result verifying unit 1120 and the word sequence displaying unit 1130 may be identical to the operations of the speech recognition result verifying unit 730 and the word sequence displaying unit 740. Accordingly, duplicated descriptions with respect to the speech recognition result verifying unit 1120 and the word sequence displaying unit 1130 will be omitted for to avoid repetition.

The speech recognition result generating unit 1110 may generate a result of speech recognition corresponding to a sound signal that may be input through an input device. A method of generating a result of speech recognition has been previously described and thus, duplicated descriptions will be omitted to avoid repetition.

Figure 12:
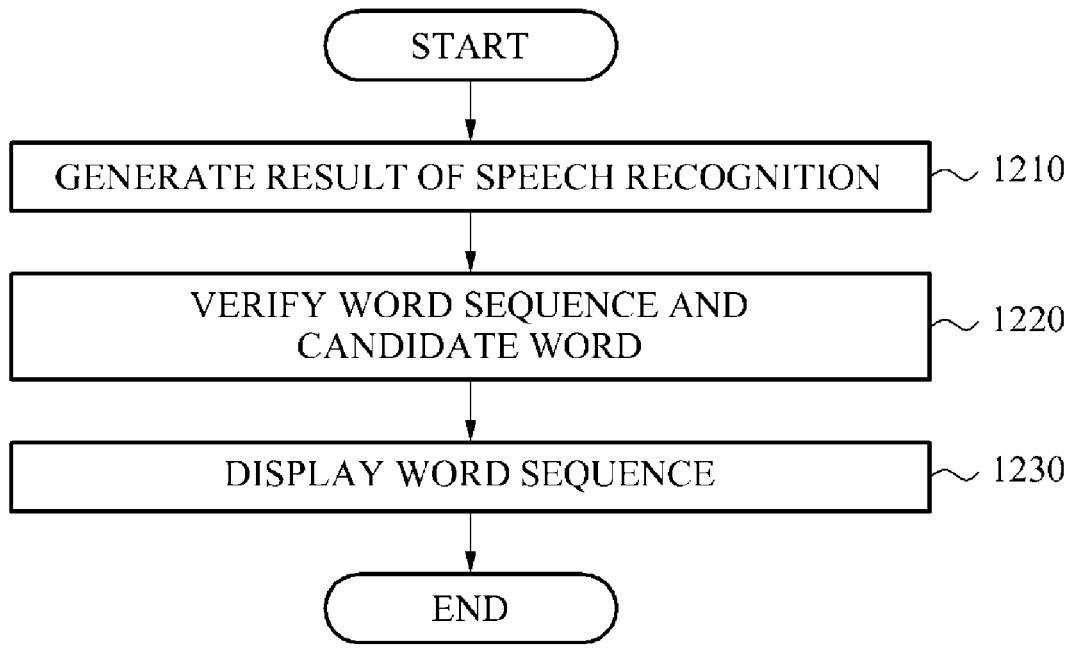
FIG. 12 is a flowchart illustrating a speech recognition method according to exemplary embodiments of the present invention.

FIG. 12 is a flowchart illustrating a speech recognition method according to exemplary embodiments of the present invention. The speech recognition method may be performed by the speech recognition system 1100 of FIG. 11.

If operation 1210 is not performed, the speech recognition method of FIG. 12 may be identical to the speech recognition method of FIG. 8 in which the speech recognition system 700 may not perform operations 810 and 820. Operations 1220 and 1230 may be identical to operations 830 and 840. Accordingly, duplication descriptions with respect to operations 1220 and 1230 will be omitted to avoid repetition.

In operation 1210, the system 1100 may generate a result of speech recognition corresponding to a sound signal that may be input through an input device. The input device may be, for example, a microphone. A method of generating a result of speech recognition has been previously described and thus, duplicated descriptions will be omitted to avoid repetition.

The descriptions provided with respect to FIG. 1, FIG. 2, FIG. 3, FIG. 4, FIG. 5, and FIG. 6 may be referred to for descriptions omitted with respect to FIG. 7, FIG. 8, FIG. 9, FIG. 10, FIG. 11, and FIG. 12.

In some cases, a candidate word may be provided to a user terminal 110 in a list form. For example, the speech recognition system corresponding to the user terminal 110 of FIG. 1 may transmit, to a speech recognition server 120, a sound signal that may be input through an input device, and may receive, through the speech recognition server 120, a result of speech recognition corresponding to the sound signal. When a word sequence and a candidate word for at least one word in the word sequence are provided as the result, the speech recognition system may verify the word sequence and the candidate word, and may display, on a display screen 200, the word sequence in which the at least one word having the candidate word may be displayed in a visually distinguishable manner from other words of the word sequence.

When the at least one word displayed in a visually distinguishable manner is selected by a user, the speech recognition system may display candidate words for the at least one word in a form of a list. As an example, when the at least one word displayed in a visually distinguishable manner is selected by the user, the word sequence displaying unit 740 of FIG. 7 may display a list including at least one candidate word for the at least one word displayed in a visually distinguishable manner. The word sequence displaying unit 740 may display the word sequence by replacing the at least one word displayed in a visually distinguishable manner with a candidate word selected by the user in the displayed list. The foregoing method may be applied identically to other exemplary embodiments.

Figure 13:
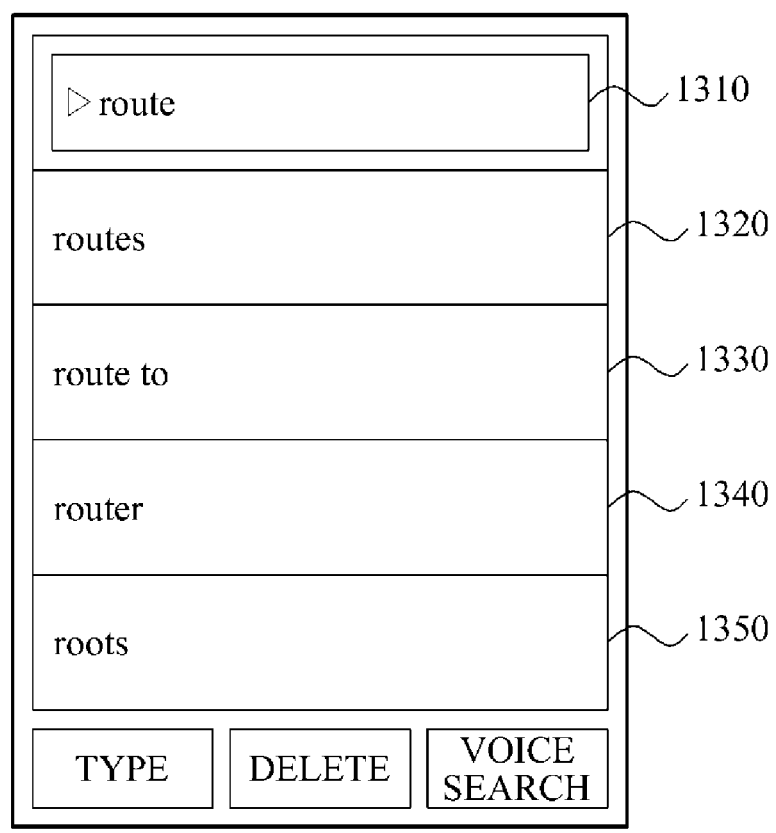
FIG. 13 is a diagram illustrating a screen displaying candidate words for a word selected by a user according to exemplary embodiments of the present invention.

FIG. 13 is a diagram illustrating a screen 1300 displaying candidate words for a word selected by a user according to exemplary embodiments of the present invention. The display screen 1300 may display a word "route" 1310 selected by a user, and candidate words 1320, 1330, 1340, and 1350 for the word "route" 1310. The user may select a candidate word to replace the word "route" 1310 from the provided candidate words 1320, 1330, 1340, and 1350. For example, when the user selects the word "routes" 1320, the speech recognition system may display a word sequence by replacing the word "route" 1310 with the selected candidate word "routes" 1320.

As previously described, when a visually distinguishable word of a word sequence is displayed and selected by the user, the speech recognition system may display candidate words for the visually distinguishable word in a list form. When one of the candidate words is selected by the user, the speech recognition system may display a word sequence by replacing the visually distinguishable word with the candidate word selected by the user.

According to exemplary embodiments of the present invention, a speech recognition system and method may provide, to a user, a word sequence in which a word having a candidate word may be displayed in a visually distinguishable manner from other words in the word sequence based on a result of speech recognition. The speech recognition system and method may display the word sequence by replacing the visually distinguishable word with a user-selected candidate word, thereby enabling the user to revise the result of the speech recognition for each word with a single selection.

According to exemplary embodiments of the present invention, a speech recognition system and method may provide more accurate speech recognition results for each word, by selecting a word sequence having a highest probability among probabilities of all possible word sequences matching a sound signal. Furthermore, a candidate word may be selected based on confidences that are calculated with respect to confidences of other words. The candidate word may be determined between a time when recognition of at least one word to be a candidate word is initiated and a time when the recognition is terminated. The at least one word. In some cases, the time period for determining the word sequence and candidate word may be determined based on the time when the at least one word recognition is initiated, the time when the at least one word recognition is terminated, and/or a predetermined allowable time value that may be added to the time when the recognition is terminated.

According to exemplary embodiments of the present invention, a speech recognition system and method may provide a user interface for deleting an entire word sequence at once, thereby enabling a user to input a sentence directly or to restart a speech recognition process when an undesirable word sequence is displayed as a result of speech recognition.

According to exemplary embodiments of the present invention, a speech recognition system and method may display or transmit a word sequence and a signature indicating that a word sequence is provided through the speech recognition, thereby enabling a user, who verifies the displayed word sequence or who receives the word sequence via a short message service (SMS) or e-mail, to ascertain that the word sequence is provided through the speech recognition. The word sequence may be a sentence provided through speech recognition.

Exemplary embodiments of the present invention may be recorded in computer-readable storage media including program instructions to implement the exemplary embodiments of the invention. The instructions may be executed by a processor of a computer. The media may also include, alone or in combination with the program instructions, data files, and data structures. The media and program instructions may be those specially designed and constructed for the purposes of the present invention, or they may be of the kind well-known and available to those having skill in the computer software arts. Examples of computer-readable media include magnetic media such as hard disks, floppy disks, magnetic tape, optical media such as CD ROM disks and DVD, magneto-optical media such as floptical disks, and hardware devices that are specially configured to store and perform program instructions, such as read-only memory (ROM), random access memory (RAM), and flash memory. Examples of program instructions include both machine code, such as produced by a compiler, and files containing higher level code that may be executed by the computer or a processor. The described hardware devices may be configured to act as one or more software modules in order to perform the operations of the above-described exemplary embodiments of the present invention.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A speech recognition system, comprising:
   a user terminal, the user terminal including a first processor configured to,
   transmit, to a speech recognition server, a sound signal input through an input device;
   receive, from the speech recognition server, a speech recognition result corresponding to the sound signal;
   verify the speech recognition result, the speech recognition result including a word sequence and at least one candidate word for at least one word in the word sequence; and
   display the word sequence, on a display device, such that the at least one word having the at least one candidate word is visually distinguishable from other words of the word sequence,
   wherein,
   in response to the at least one word being selected, the first processor is configured to display the word sequence on the display device by sequentially replacing the at least one word with a different one of the at least one candidate word such that the different ones of the at least one candidate word may be substituted into the word sequence each time the at least one word is selected without displaying a list of the at least one candidate word,
   the at least one candidate word is selected among at least one recognized word by selecting, from among the at least one recognized word, words that have a same starting time,
   if some of the at least one candidate words have the same starting time and a shorter end time, then the speech recognition server is configured to combine at least two of the recognized words to form the at least one candidate word,
   the at least one recognized word is recognized by the speech recognition server according to the sound signal during a recognition time period, and
   the recognition time period being determined based on a time when recognition of the at least one recognized word is initiated, a time when recognition of the at least one recognized word is terminated, and an allowable time value added to the time when the recognition of the at least one recognized word is terminated.

2. The system of claim 1, further comprising:
   a user interface configured to delete the word sequence in response to receiving a command through the user interface.

3. The system of claim 1, wherein the first processor is configured to transmit the word sequence to remote user devices such that a signature indicating that the word sequence was generated through a speech recognition process is transmitted along with the word sequence to the remote user devices.

4. The system of claim 1, wherein the first processor is further configured to,
   transmit, via a sound signal transmitter, the sound signal to the speech recognition server, the sound signal being input through the input device; and
   receive, via a speech recognition result receiver, from the speech recognition server, the speech recognition result corresponding to the sound signal.

5. The system of claim 4, wherein the speech recognition server comprises:
   a second processor configured to generate the speech recognition result corresponding to the sound signal input through the input device.

6. The system of claim 1, wherein the word sequence is selected as a word sequence having a highest probability among probabilities of a plurality of word sequences matching a received sound signal.

7. The system of claim 1, wherein the at least one candidate word is selected based on confidences that are calculated for each of the at least one recognized word.

8. A speech recognition system, comprising:
   a speech recognition server, the speech recognition server including a processor configured to,
   receive, via a sound signal receiver, a sound signal from a terminal, the sound signal being input through an input device of the terminal,
   recognize at least one recognized word during a recognition time period, the recognition time period being determined based on a time when recognition of the at least one recognized word is initiated, a time when recognition of the at least one recognized word is terminated, and an allowable time value added to the time when the recognition of the at least one recognized word is terminated,
   determine a word sequence corresponding to the sound signal and at least one candidate word for at least one word in the word sequence, the candidate word being selected from among the at least one recognized word by,
     selecting, from among the at least one recognized word, words that have a same starting time, and
     combining at least two of the recognized words to form the at least one candidate word, if some of the at least one candidate words have the same starting time and a shorter end time,
   generate a speech recognition result, the speech recognition result including the word sequence and the at least one candidate word, and
   provide the speech recognition result to the terminal,
   wherein
   the word sequence is displayed on the terminal such that the at least one word is visually distinguishable from other words of the word sequence, and
   in response to selection of the at least one word, the word sequence is displayed by sequentially replacing the at least one word with the at least one candidate word such that the different ones of the at least one candidate word may be substituted into the word sequence each time the at least one word is selected without displaying a list of the at least one candidate word.

9. The system of claim 8, wherein the terminal comprises:
   a user interface configured to delete the word sequence in response to receiving a command via the user interface.

10. The system of claim 8, wherein the speech recognition server is configured to attach a signature indicating that the word sequence was generated through a speech recognition process to the word sequence such that, when the terminal transmits the word sequence to remote terminals, the word sequence is
    transmitted along with the word sequence to the remote terminals.

11. The system of claim 8, wherein the processor selects, as the word sequence, a word sequence having a highest probability among probabilities of a plurality of word sequences matching the sound signal.

12. The system of claim 8, wherein the at least one candidate word is selected based on confidences that are calculated for each of the at least one recognized word.

13. A speech recognition method, comprising:
verifying, by a processor, a word sequence and at least one candidate word for at least one word in the word sequence in response to receiving a speech recognition result from a speech recognition server, the speech recognition result including the word sequence and the at least one candidate word;
displaying, by a display device connected to the processor, the word sequence such that the at least one word is visually distinguishable from other words of the word sequence,
sequentially replacing the at least one word with the at least one candidate word in response to the at least one word being selected such that the different ones of the at least one candidate word may be substituted into the word sequence each time the at least one word is selected without displaying a list of the at least one candidate word, wherein,
the at least one candidate word is selected among at least one recognized word by selecting, from among the at least one recognized word, words that have a same starting time,
if some of the at least one candidate words have the same starting time and a shorter end time, then the speech recognition server is configured to combine at least two of the recognized words to form the at least one candidate word,
the at least one recognized word is recognized by the speech recognition server according to the sound signal during a recognition time period, and
the recognition time period being determined based on a time when recognition of the at least one recognized word is initiated, a time when recognition of the at least one recognized word is terminated, and an allowable time value added to the time when the recognition of the at least one recognized word is terminated.

14. A speech recognition method, comprising:
receiving a sound signal from a terminal, the sound signal being input through an input device of the terminal,
recognizing, by a processor, at least one recognized word during a recognition time period, the recognition time period being determined based on a time when recognition of the at least one recognized word is initiated, a time when recognition of the at least one recognized word is terminated, and a allowable time value added to the time when the recognition of the at least one recognized word is terminated,
determining, by the processor, a word sequence corresponding to the sound signal and at least one candidate word for at least one word in the word sequence, the candidate word being selected from among the at least one recognized word by,
selecting, from among the at least one recognized word, words that have a same starting time, and
combining at least two of the recognized words to form the at least one candidate word, if some of the at least one candidate words have the same starting time and a shorter end time;
generating, by the processor, the word sequence and the at least one candidate word as a speech recognition result; and
providing the speech recognition result to the terminal, wherein
the word sequence is displayed on the terminal such that the at least one word is visually distinguishable from other words of the word sequence, and
in response to selection of the at least one word, the word sequence is displayed by sequentially replacing the at least one word with the at least one candidate word such that the different ones of the at least one candidate word may be substituted into the word sequence each time the at least one word is selected without displaying a list of the at least one candidate word.

15. A non-transitory computer-readable storage medium comprising a program, that when executed, instructs a processor to perform the method of claim 13.

* * * * *